(12) United States Patent
Suvakovic (10) Patent No.: US 8,538,258 B2
(45) Date of Patent: Sep. 17, 2013

(54) BURST-MODE DATA RECOVERY FOR MULTI-GIGABIT PASSIVE OPTICAL NETWORKS

(75) Inventor: Dusan Suvakovic, Marina del Rey, CA (US)

(73) Assignee: Alcatel Lucent, Paris (FR)

( * ) Notice: Subject to any disclaimer, the term of this patent is extended or adjusted under 35 U.S.C. 154(b) by 1237 days.

(21) Appl. No.: 12/151,645

(22) Filed: May 8, 2008

(65) Prior Publication Data

US 2009/0279886 A1 Nov. 12, 2009

(51) Int. Cl.
*H04L 7/00* (2006.01)
(52) U.S. Cl.
USPC ............... 398/35; 398/99; 398/100; 398/153
(58) Field of Classification Search
USPC .............. 398/35, 155, 159, 202, 208, 25, 26, 398/153, 154, 98–101; 375/326, 342, 359
See application file for complete search history.

(56) References Cited

U.S. PATENT DOCUMENTS

| | | | | |
|---|---|---|---|---|
| 4,731,784 A * | 3/1988 | Keller et al. | ..................... | 398/99 |
| 4,809,257 A * | 2/1989 | Gantenbein et al. | .......... | 398/128 |
| 5,493,571 A * | 2/1996 | Engdahl et al. | ............... | 370/514 |
| 7,239,813 B2 * | 7/2007 | Yajima et al. | ................. | 398/154 |
| 7,301,970 B2 * | 11/2007 | Kim et al. | ..................... | 370/535 |
| 7,583,898 B1 * | 9/2009 | Dalton et al. | ................. | 398/100 |
| 7,630,639 B2 * | 12/2009 | Kramer et al. | .................. | 398/72 |
| 7,697,844 B2 * | 4/2010 | Guo et al. | ....................... | 398/69 |
| 8,184,987 B2 * | 5/2012 | Chen et al. | .................... | 398/176 |
| 8,249,458 B2 * | 8/2012 | Mizutani et al. | .............. | 398/100 |
| 8,326,152 B2 * | 12/2012 | Van Veen et al. | ............... | 398/72 |
| 2002/0171895 A1 * | 11/2002 | Chang | ........................... | 359/168 |
| 2004/0028405 A1 * | 2/2004 | Unitt et al. | ...................... | 398/32 |
| 2004/0254915 A1 * | 12/2004 | Motoyama et al. | ............... | 707/3 |
| 2005/0032491 A1 * | 2/2005 | Carballo et al. | .............. | 455/135 |
| 2005/0169302 A1 * | 8/2005 | Lee et al. | ...................... | 370/465 |
| 2007/0104297 A1 * | 5/2007 | Gorday | ......................... | 375/343 |
| 2007/0140689 A1 * | 6/2007 | Haran | ............................. | 398/27 |
| 2007/0211835 A1 * | 9/2007 | Inagawa et al. | ............... | 375/343 |
| 2008/0013668 A1 * | 1/2008 | Willis | ............................. | 377/56 |
| 2008/0069562 A1 * | 3/2008 | Ivry | ................................ | 398/52 |
| 2008/0137790 A1 * | 6/2008 | Cranford et al. | .............. | 375/357 |

* cited by examiner

*Primary Examiner* — Nathan Curs
*Assistant Examiner* — Tanya Ngo
(74) *Attorney, Agent, or Firm* — RGIP LLC (57) ABSTRACT

In a TDMA optical network, a clock data recovery module uses signal oversampling and preamble correlation together with enhanced performance modules to extract additional data from the upstream transmission signal. Information including duty cycle, ONT power estimation, signal noise and jitter can be extracted from the upstream signal using digital logic and used to tune network components and/or alleviate network conditions.

13 Claims, 9 Drawing Sheets

BURST-MODE DATA RECOVERY FOR MULTI-GIGABIT PASSIVE OPTICAL NETWORKS

FIELD OF THE INVENTION

This invention relates to passive optical networks and in particular to processing upstream signals in an optical line termination of a time division multiple access (TDMA) network.

BACKGROUND OF THE INVENTION

Figure 1:
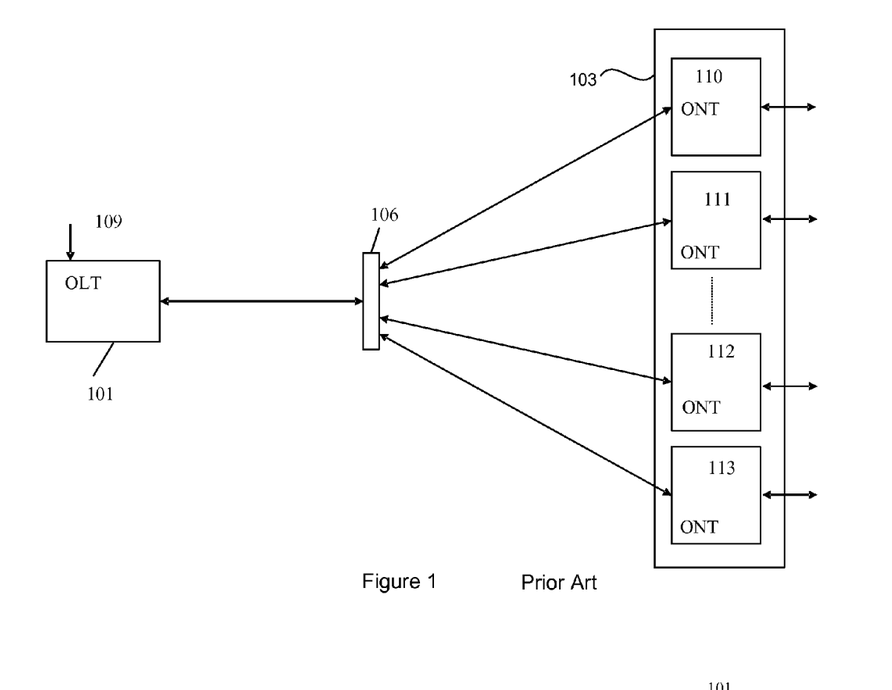
FIG. 1 shows a general PON system.

Passive optical network (PON) is a widely used technology for residential and business broadband access. PONs are considered to be inexpensive for network operators because they do not require any active equipment or power supplies between the operator's central office (CO) and customer's premises (CP). As shown in FIG. 1, downstream PON traffic is directed from the Optical Line Terminal (OLT) 101 residing in the CO towards a number of Optical Network Terminals (ONT) 110, 111, 112, 113 residing on the CP end 103. A power splitter 106 directs traffic to the individual ONTs.

Since the OLT 101 is the only unit transmitting in the downstream direction, there can be no collision between downstream-bound packets. Upstream PON traffic shares the same optical fiber with the downstream traffic, utilizing a different wavelength. Therefore, there cannot be any collision between downstream and upstream packets either. However, since the upstream traffic originates from all ONTs and all ONTs are transmitting on the same wavelength, packet collision can occur if two or more ONTs are transmitting simultaneously. In order to prevent collisions, upstream PON traffic is managed in the Time Division Multiple Access (TDMA) fashion. One of the functions of the OLT 101 is to schedule and grant separate time slots to each ONT, thus avoiding collision between upstream packets. Transmitter lasers of each ONT can be turned on only during their respective transmission time slots.

The OLT 101 must be capable of receiving bursts of data from different ONTs. The structure of a typical OLT 101 is shown in greater detail in FIG. 2 and includes an OLT digital chip 201 and an OLT optics module 205. Downstream signals from OLT MAC (tx) 202 are serialized on the OLT digital chip 201 by serializer 203. The downstream signals 213 then pass to laser driver and laser 206 of the OLT optics module 205, then through WDM filter 207 to be transmitted downstream 219 to power splitter 106. Upstream signals are received by a burst-mode receiver which includes a photo detector (PD) 210, transimpedance amplifier (TIA) 209 and limiting amplifier (LA) 208 of the OLT optics module 205 and data recovery (CDR) circuitry 204 of the OLT digital chip 201. The PD 210 performs conversion of the received optical signal into an electrical signal. The TIA 209 and LA 208 restore the electrical signal to a standard digital voltage level, and the CDR 204 extracts the transmitted data contents from the LA output signal 214.

Figure 2:
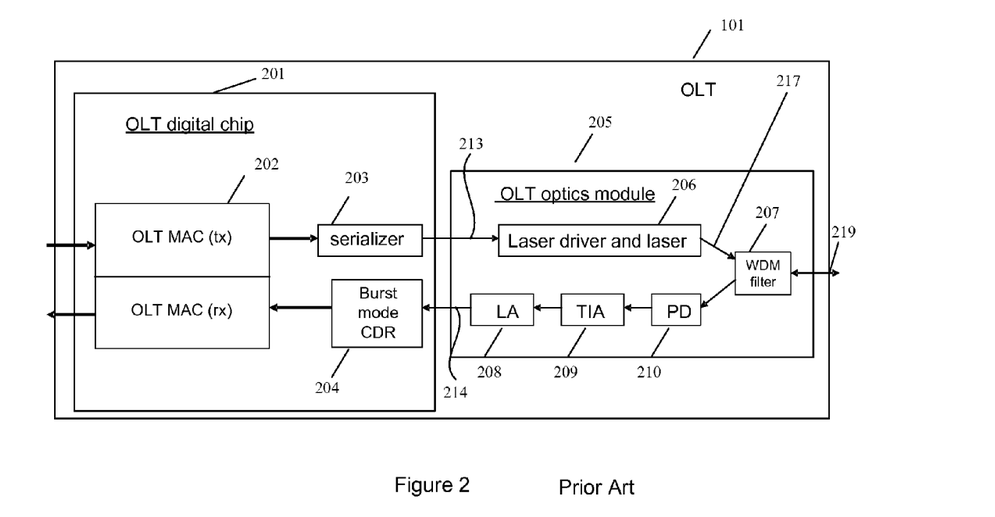
FIG. 2 shows a block diagram of an OLT, including the detailed structure of a typical burst-mode receiver.

The standard upstream bit rates have been steadily going up from the initial 155 Mb/s in APON in the mid-1990s, to 1.25 Gb/s in Gigabit-capable PON (GPON) [ITU-T G.984] and Ethernet PON (EPON) [IEEE 802.3ah] of mid-2000s and are likely to reach 10 Gb/s in the early 2010s. The high bit rates pose an increasing challenge for implementation of the burst-mode receiver, particularly of its analog circuits. Particularly, it is very difficult to design the TIA 209 and LA 208 that can restore the received signal fast enough and without distortion of its duty cycle, while supporting a wide dynamic range of the input signal.

Among various burst-mode CDR methods, oversampling CDR architectures appear to be particularly practical because they do not require the receiver PLL to lock on the frequency and phase of the transmitter's clock. Additionally, oversampling CDRs are convenient for implementation because they are almost completely based on digital circuits.

However, in existing systems, the TIA, LA and CDR are optimized separately and don't "talk" to each other. As the bit rates go up, the analog circuits available for TIA and LA implementation become less efficient, hard to design and tune and typically not fast enough to meet the standard specification. This can result in the loss of entire upstream bursts due to the OLT's failure to detect the delimiter, or in the loss of individual packets due to the increased bit error rate caused by the distorted signal at the LA output. Mitigation of this problem by increasing the preambles and margins between bursts, results in lower bandwidth utilization.

What is required is a system that uses available information to adjust network performance and/or alleviate network conditions.

SUMMARY OF THE INVENTION

In one aspect of the disclosure, there is provided a data recovery system for a time division multiple access network. The data recovery system comprises at least a signal sampler, a preamble correlator, a delimiter detector and a finite state machine that controls extraction of data from an oversampled signal. The signal sampler samples an input signal at a frequency higher than a frequency of the input signal to produce an oversampled signal. The preamble correlator detects a preamble in the oversampled signal. The delimiter detector detects a delimiter in the oversampled signal. The finite state machine comprises a first state prior to detection of a preamble by the preamble correlator, a second state after detection of the preamble and prior to detection of a delimiter by the delimiter detector, and a third state after detection of the delimiter.

In one aspect of the disclosure, there is provided an integrated circuit for use in an optical line termination of a passive optical network. The integrated circuit includes circuitry for oversampling an upstream signal, correlating a preamble of the oversampled signal and processing a correlated oversampled signal to diagnose one or more conditions of the passive optical network.

In one aspect of the disclosure, there is provided a method of diagnosing at least one network condition of a passive optical network. The method comprises sampling an input signal at a frequency higher than a frequency of the input signal to produce an oversampled signal, correlating a preamble of the oversampled signal, wherein correlating the preamble comprises determining a phase of the oversampled signal and extracting data relating to the at least one network condition from the oversampled signal, wherein extracting data utilizes a correlated preamble of the oversampled signal.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 3:
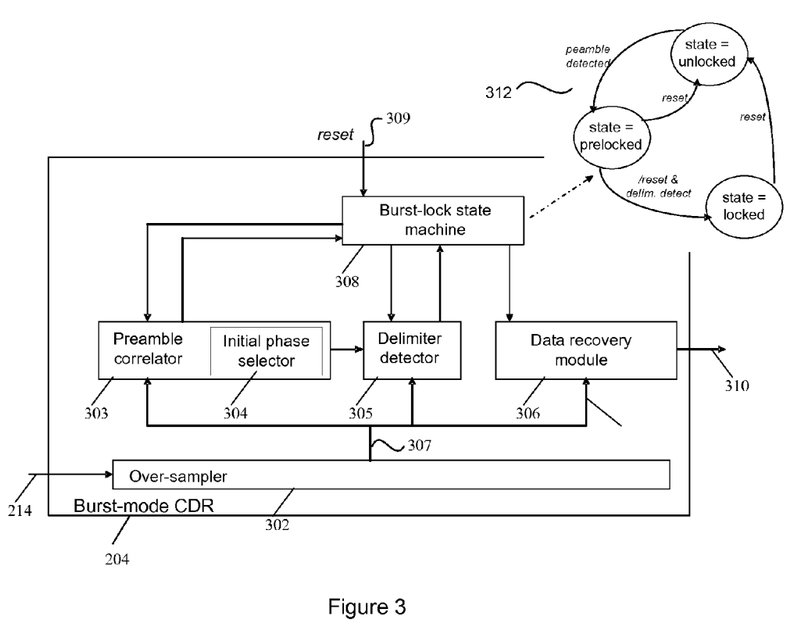
FIG. 3 shows a data recovery module.

FIG. 3 schematically shows the internal workings of a burst-mode CDR 204 in accordance with an embodiment of the disclosure. The burst-mode CDR 204 includes a buffered shift register 302, a preamble correlator 303, delimiter detector 305, a data recovery module 306 and a burst-lock finite state machine (FSM) 308. The preamble correlator 303 includes an initial phase selector 304. Serial input bit stream 214 from LA 208 (FIG. 2) is continuously oversampled and entered serially into the shift register 302. Oversampling requires the input signal to be sampled at a frequency higher than the frequency of the input signal. The oversampling rate M is a multiple of the nominal data rate, i.e., M is the ratio of the sampling frequency to the frequency of the input signal 214. The output of the shift register 302 is updated synchronously to the digital clock driving blocks 303, 304, 305, 306 and 308. The frequency of this clock is a 1/N fraction of the oversampling clock, where N is an integer selected to ensure feasible clocking of digital logic for the chosen implementation technology. In one embodiment, the length of the shift register is equal to the number of samples collected during one period of the digital clock. The clock used for oversampling may be derived from a local reference clock (not shown), using a phase-locked loop (PLL). Hereafter, an embodiment of the invention for which M=5 (5-times oversampling) is described but it will be clear to those skilled in the art that, other values of M are also possible. In various embodiments, odd integer values of M that are greater than or equal to 3 may be suitable.

Figure 6:
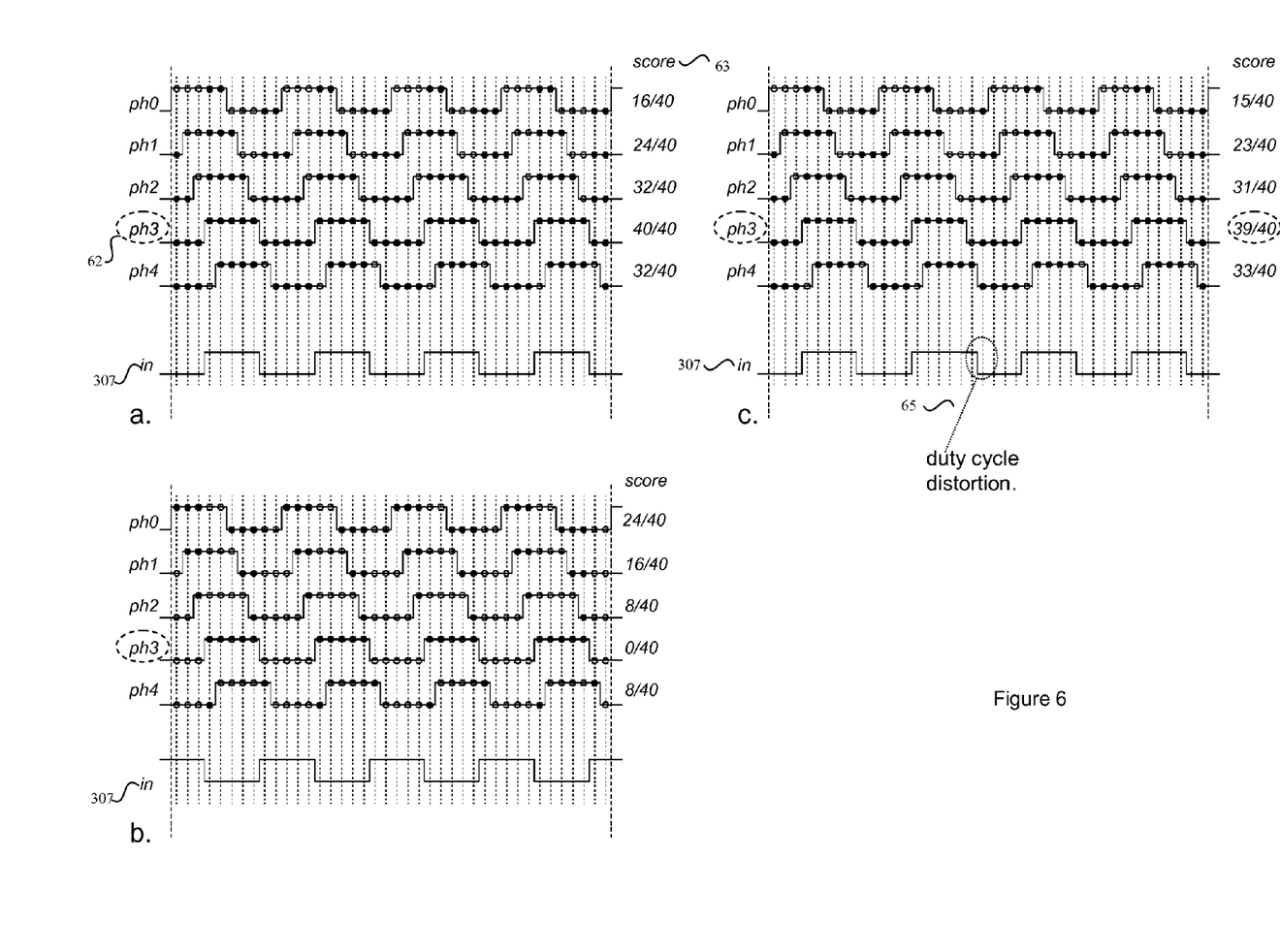
FIG. 6 shows waveforms illustrating operation of a preamble correlator.

The CDR 204 of FIG. 3 operates in three states, controlled by the burst-lock state machine 308. The state-flow diagram 312 of this state machine is shown in FIG. 3. Upon activation of the reset signal 309, the burst-lock state machine 308 is in an "unlocked" state. In this first state, the preamble correlator 303 attempts to detect the known bit pattern of the preamble. This is done by comparing the oversampled segments of the input bit stream 307, with segments of the preamble at all phases of the oversampling clock using the initial phase selector 304, as illustrated in the examples shown in FIG. 6. Each comparison is given a score 63 indicating the degree of match. In these examples, it is assumed that the preamble is an alternating ... 101010 ... bit pattern, which is commonly the case in various communication standards. In the example shown in FIG. 6a, all 40 samples of the oversampled input bit sequence 307 match the corresponding samples of the preamble segment of phase ph3 62, thus phase ph3 61 is given a score of 40/40. The input bit sequence 307 in FIG. 6b has exactly the opposite phase of that of the preamble segment ph3 and all its samples mismatch the corresponding samples of ph3 62, thus producing a score of 0/40. However, it should be noted that the ideal sampling phase for the inputs in FIGS. 6a and 6b is the same. Therefore, a preamble segment phx is considered the best match for the input bit sequence 307 if one of the following conditions is met: a) the number of matching samples (i.e. "score") for phx and input sample 307 is greater or equal to some high threshold value $N_{th}$ or b) the score for phx and input 307 is less or equal to some low threshold value $N_{tl}$. $N_{th}$ is chosen to be a value close enough to the maximum number of samples observed, that can efficiently single out the matching phase. Similarly, the value of $N_{tl}$ is chosen to be close to zero. The threshold values are used because it is often impossible to establish either a perfect match or a perfect mismatch between one of the phx sequences and input 307, due to imperfections of the input signal waveform 307. This imperfection is typically in the form of duty-cycle distortion, which produces pulses wider or narrower than the nominal M samples, as illustrated in FIG. 6c where one shifted edge 65 creates a 6-ones pulse followed by a 4-zeros pulse. In this example, ph3 is still the best matching phase for input 307 with the score of 39, which is higher than the score for any other preamble phase, but is less than the maximum 40, due to the input signal distortion.

With reference again to FIG. 3, the first time the preamble correlator 303 finds a matching phase for the input signal, the state of the burst-lock FSM 308 changes its state from "unlocked" to "pre-locked". The FSM 308 stays in the second "pre-locked" state until the delimiter detector 305 detects the delimiter pattern in the input bit stream 307. Before delimiter detection, in the "pre-locked" state, the remainder of the preamble continues to arrive and the preamble correlator continues to update the initial phase selection. This is beneficial because it provides the most accurate phase estimate at the moment of delimiter detection. Delimiter detector 305 uses the initially selected phase of initial phase selector 304 to down-sample the bit stream and detect the delimiter. Upon detection of the delimiter, the FSM 308 changes its state to a third available state, i.e. a "locked" state, which activates the data recovery module 306. This data recovery module 306 starts sampling the payload data, at first using the initial sampling phase. Module 306 is a blind oversampling module the function and implementation of which is described in detail in the Applicant's co-pending patent application titled "High Speed Serial Transceiver With Sub-Nominal Rate Operating Mode", the entire contents of which are incorporated herein by reference.

Figure 4:
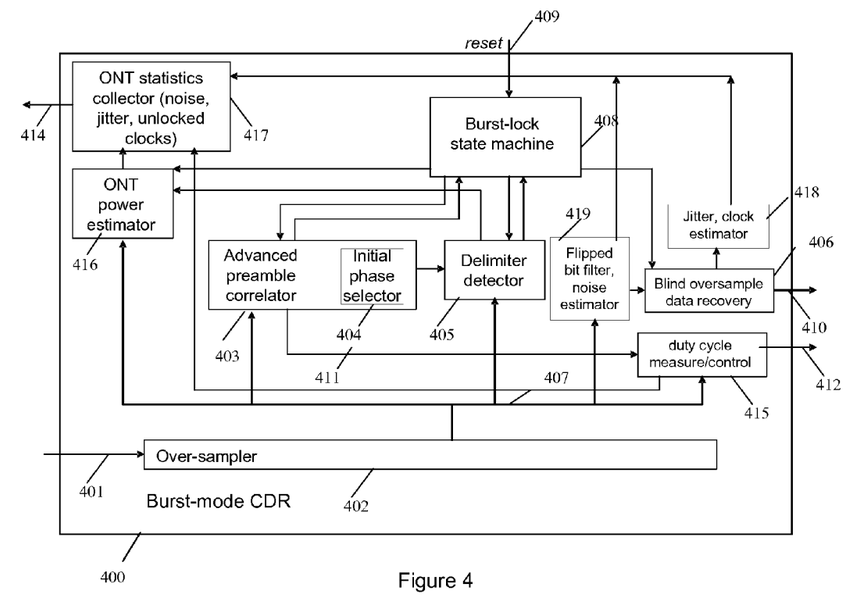
FIG. 4 shows the detailed structure of a clock data recovery system with performance enhancement modules.

A modified form of the burst mode CDR of FIG. 3 is illustrated in FIG. 4. The burst mode CDR 400 includes an over sampler 401, shift register 402, initial phase selector 404, delimiter detector 405, data recovery module 406 and state machine 408 that perform the same functions as the respective components shown in FIG. 3. In addition, the CDR 400 includes an advanced preamble correlator 403, of which the initial phase selector 404 forms a part, as well as additional performance enhancing modules including an ONT power estimator 413, duty cycle measure/control unit 415, jitter and clock estimator 418 and ONT statistics collector 414. The function of the advanced preamble correlator 403, compared to module 303 of FIG. 3 is extended to include duty cycle detection and control of the optics module as will be described in greater detail below. The additional and advanced modules of the CDR 401 may provide data to an ONT statistics collector 417 that can be used to adjust and tune one or more parameters of one or more components of the PON network.

Figure 5:
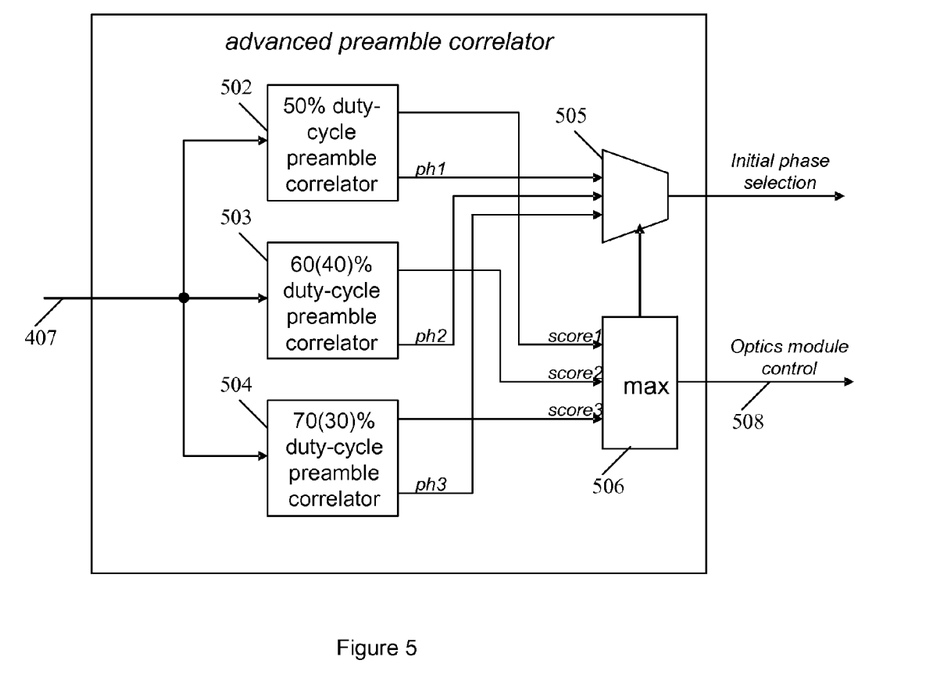
FIG. 5 shows a clock data recovery system with an advanced preamble correlator.
Figure 7:
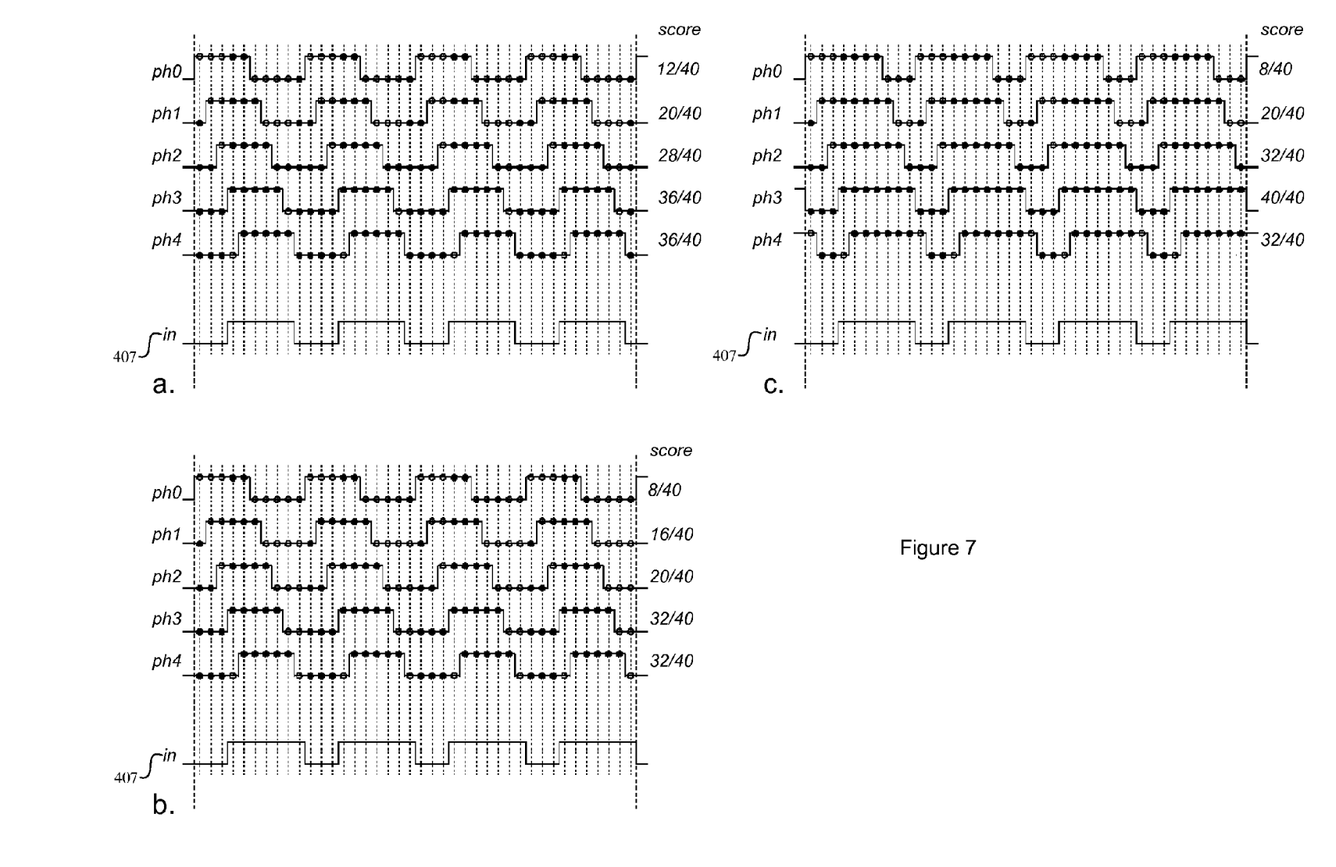
FIG. 7 shows waveforms illustrating operation of an advanced preamble correlator.

The use of a single preamble correlator does not provide insight into the duty cycle of the input signal. Improved phase detection and duty cycle detection can be achieved by introducing additional correlators utilizing patterns with non-ideal duty cycle. FIG. 5 shows an example structure of the advanced preamble correlator 403, consisting of 3 preamble correlators 502, 503, 504, each one comparing the oversampled input bit stream 407 with a set of preamble segments featuring different duty cycle. In the example shown in FIG. 5, the correlator 502 is identical to the correlator 303 of FIG. 3, which compares the oversampled input bit stream 407 with a number of oversampled, phase-shifted preamble segments featuring ideal 50% duty cycle. However, if the duty cycle of the input signal 407 is systematically distorted, the correlator 502 becomes less efficient in detecting the best sampling phase. FIG. 7 shows the phase selection of the advanced preamble correlator 403 when the input signal 407 is distorted to a 70% duty cycle. FIG. 7a shows the phase selection of preamble correlator 502 operating on a 50% duty cycle basis. As shown in FIG. 7a, the score for ph3 and ph4 is equal at 36, leading to phase ambiguity. Similarly, FIG. 7b shows the phase selection of preamble correlator 503 operating on a 60% duty cycle basis. As shown in FIG. 7b, the score for ph3 and ph4 is equal at 32. Thus there is phase ambiguity as well as a score insufficient to trip the $N_{th}$ threshold. FIG. 7c shows the phase selection of preamble correlator 504 operating on a 70% duty cycle basis. As shown in FIG. 7c, a single phase, phase ph3 has a perfect score which accurately indicates both the phase and the duty cycle of the input signal.

The advanced preamble correlator of FIG. 5 can determine the duty cycle of the input signal by finding the maximum score across correlators 502, 503 and 504. The best sampling phase for the correlator achieving the maximum score will be selected as the initial sampling phase and passed to initial phase selection unit 505. Additionally, selector 506 selects the highest scoring duty cycle and passes the duty cycle information 508 to the ONT statistics collector 417 (FIG. 4). The duty cycle information can be used for fine tuning of the optics module until 50% duty cycle (or other ideal output) is achieved.

Additional modules 415, 419 and 418 perform: duty cycle measurement, "flipped" bit filtering and jitter/clock estimation functions, respectively. All these additional functions are enabled by the availability of additional information in the oversampled bit stream 407, which can be used in a way beneficial for the overall PON performance, such as for fine tuning one or more components of the PON.

Whereas the preamble correlator 403 is capable of performing duty cycle detection and consequent control of the optics module while the preamble is being received i.e. in the "unlocked" and "pre-locked" states, it is also possible to continue this control in the "locked" state. However, since the bit pattern received in the "locked" state is not known up-front, the bit duty cycle is measured in a different way. Logic residing in the duty cycle measurement module 415 performs this measurement by comparing a certain segment of the oversampled input bit stream 407, with oversampled images of a single bit of various widths (equivalent to duty-cycle), for example:

| | |
|---|---|
| 01110 | (30% duty-cycle), |
| 011110 | (40% duty-cycle), |
| 0111110 | (50% duty-cycle), |
| 01111110 | (60% duty-cycle), |
| 011111110 | (70% duty-cycle), | at all possible phase shifts. For every perfect match detected, the counter for the corresponding bit width is incremented. Once one of the counters reaches a specified threshold, it is assumed that the duty cycle is determined. If it happens to be a value other than 50% (or some other predetermined ideal value), controls for the optics module are adjusted by module 415. During the "unlocked" and "pre-locked" state, the described logic of module 415 is bypassed and the optics module controls are driven by the advanced preamble estimator 403.

Figure 8:
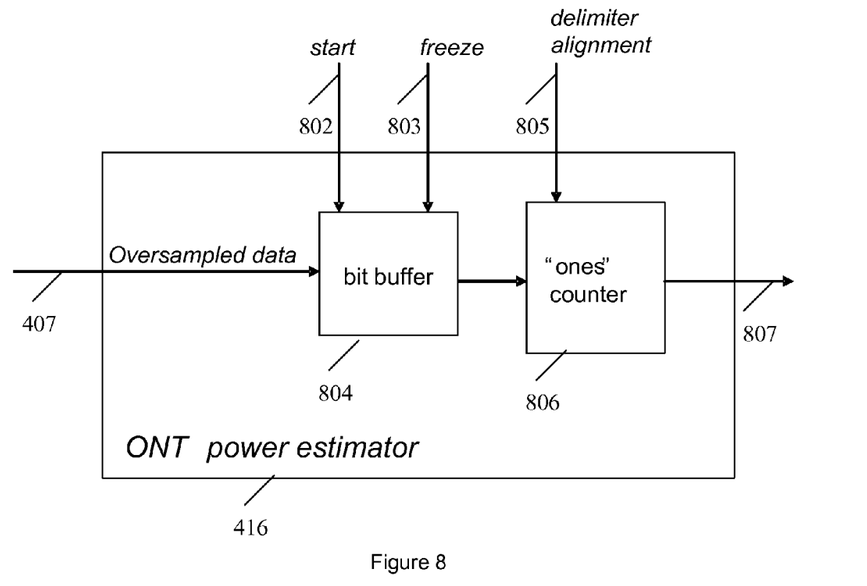
FIG. 8 shows a block diagram of the ONT power estimator of FIG. 4.
Figure 9:
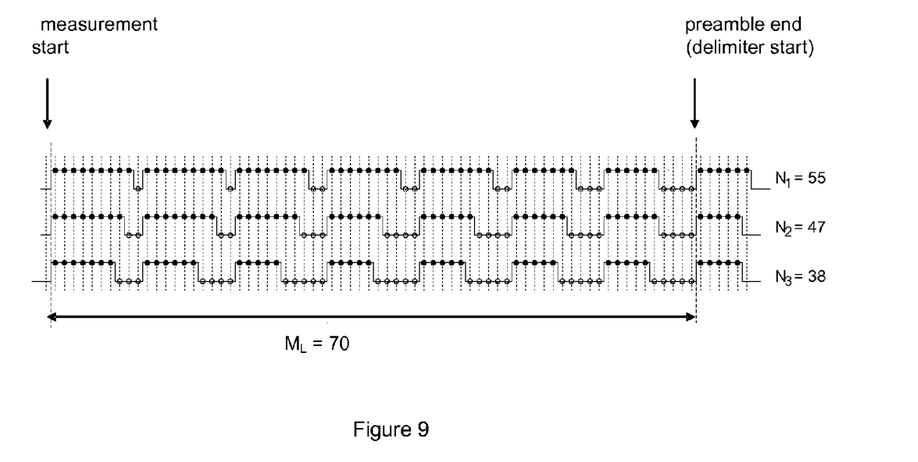
FIG. 9 shows waveforms illustrating operation of the ONT power estimator of FIG. 8.

Remote estimation of ONT power is also enabled by oversampling of the received signal 401. An embodiment of the ONT power estimator 416 of FIG. 4 is shown in FIG. 8. The ONT power estimator 416 includes a bit buffer 804 followed by a "ones" counter 806. A "start" pulse 802, driven by the burst-lock state machine 408, initiates data collection at the beginning of the "unlocked" state. The bit buffer stores the incoming oversampled bits 407 throughout the "unlocked" and the "pre-locked" state. The bit buffer stores only the last "PB" bits, corresponding with the length of the preamble, while dropping the previously stored bits. Delimiter detection by module 405 of FIG. 4 triggers a "freeze" pulse 803, causing the bit buffer 804 to hold the currently stored data and stop acquiring new input bits. At the same time, a signal "delimiter_alignment" provides information about the exact position of the beginning of the delimiter in the bit buffer 804, to the "ones" counter 806. The ones counter 806 then reads the bit buffer 804 and counts all logic "ones" stored from the beginning of the buffer to the delimiter start position. By doing this, it is possible to distinguish optical transmit power levels of different ONTs at the receiver. Due to bandwidth limitations of the analog electronics components TIA 209 and LA 208 in the optics module 205, higher power of the optical signal results in the greater and longer lasting distortion of the preamble duty cycle. As illustrated in FIG. 9, this distortion translates into a higher number of "ones" in the oversampled image of the preamble in a fixed time window preceding the delimiter detection. FIG. 9 shows a signal $N_1$ with a score of 55 ones in a time window of 70 whereas signal $N_3$ shows a score of 38 in the same time window. The indication is therefore that the ONT producing signal $N_1$ is operating at a higher power level than the ONT producing signal $N_3$. These results may be passed from the power estimation module 416 to the ONT statistics collector 417 to allow power leveling of the ONTs to be performed. Power leveling is beneficial because it can improve the burst-mode performance of the OLT optics module, which is critical at higher bit rates.

Figure 10:
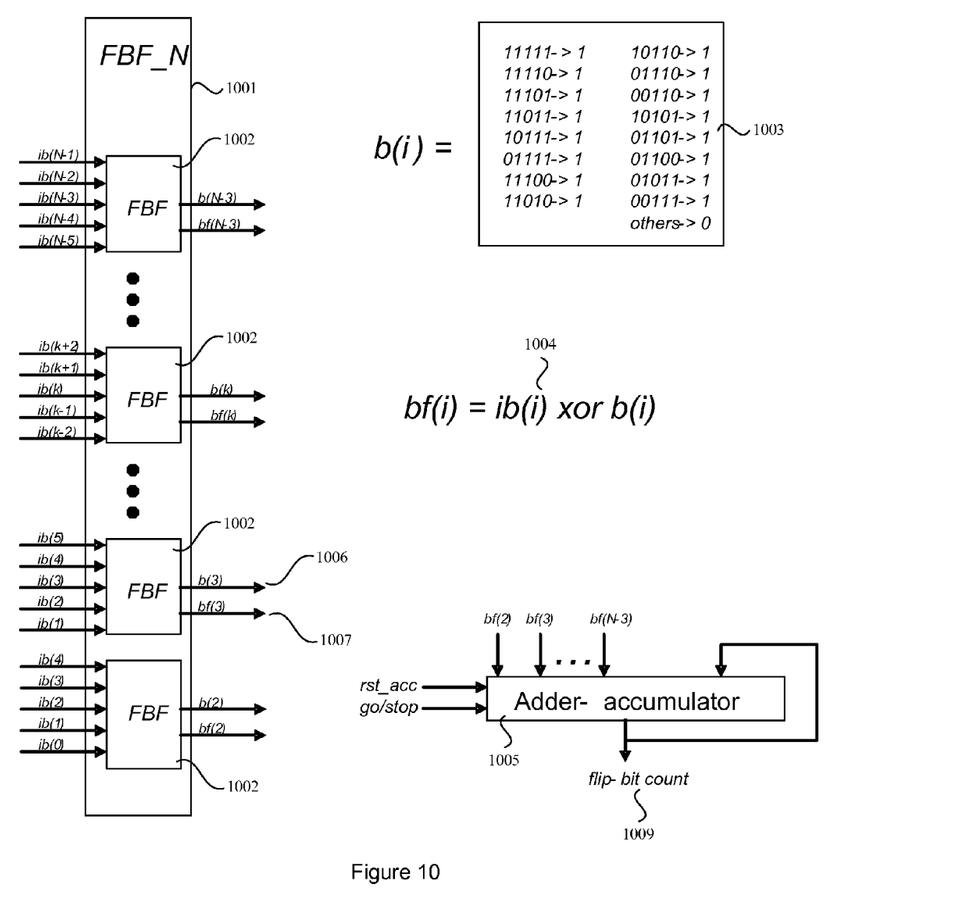
FIG. 10 shows a block diagram and filtering function for the flipped-bit filter of FIG. 4.

Digital filtering of noise is also made possible in the oversampling CDR 401. As indicated in FIG. 4, module 419 provides filtering of "flipped bits". Flipped bits in the oversampled image of the CDR input signal are the result of narrow spikes superimposed on this signal, caused by various sources of noise, including crosstalk between the upstream and downstream signals. An embodiment of a flipped bit filter is shown in FIG. 10. The flipped bit filter 1000 is an array 1001 of combinational logic blocks FBF 1002. The inputs to each FBF block are M consecutive bits of the oversampled input bit stream 407. In the embodiment of FIG. 10, for 5-times oversampling, M=5 though other values of M are possible. The number of FBF blocks 1002 for the N-bit input, is equal to N−M+1, covering all groups of M consecutive bits. The FBF logic function table 1003 for filter output bit b(i) 1006 and M=5 is also shown in FIG. 10. Also shown is the logic function 1004 for FBF output bf(i) 1007, which is set to logic '1' every time a flipped bit is corrected by filter b(i) through the use of an "exclusive OR" function. Adder-accumulator 1005 sums up all logic 1s among bf outputs 1007 from all FBF units 1002, for the duration of a burst. This information is collected by ONT statistics collection module 417 of FIG. 4 and delivered to the system management logic as a measure of noise associated with the transmitting ONT.

Module 418 in FIG. 4 estimates jitter in the received bit stream and potentially detects unlocked ONT transmit clocks, using information available from the data recovery module 406. The process of data recovery involves detection of phase shifts in the input bit stream and consequent adjustment of the sampling phase. Module 406 notifies module 418 of the phase shift size and polarity every time such shift occurs. Module 418 counts such events, calculates the total phase shift in one direction and reports statistics such as the total phase shift for the duration of the burst, the maximum phase shift in one direction and the minimum and maximum duration of phase shifting in one direction. Hardware implementation of counters, timers and other logic required for this purpose is known to those skilled in the art, thus it is unnecessary to describe it in detail. Based on the information collected by module 418, the system management logic, which may be implemented in software running on a local or remote CPU, can characterize the upstream jitter for each ONT and determine whether the maximum jitter specifications are exceeded. This is beneficial because it can help the network operator improve the system performance by identifying faulty ONT units, or by establishing statistical correlation between substandard behavior with equipment from certain vendors or by establishing correlation between jitter and physical distance of individual ONTs etc. Moreover, these statistics can be used to detect ONT transmit clocks unlocked from the OLT master clock, if it is determined that the phase shift always occurs in the same direction.

All information collected from the oversampled image of the input signal 407, including preamble duty cycle, preamble duty cycle settling time, frequency of flipped bit occurrences, jitter and power estimation, is collected by ONT statistics collector 417 of FIG. 4 and delivered to the system management logic through data path 414. While statistics collection and reporting is described as being performed by module 417 it will be apparent to a person skilled in the art the same functionality can be achieved by system management logic directly accessing the individual modules of the CDR 401.

Figure 11:
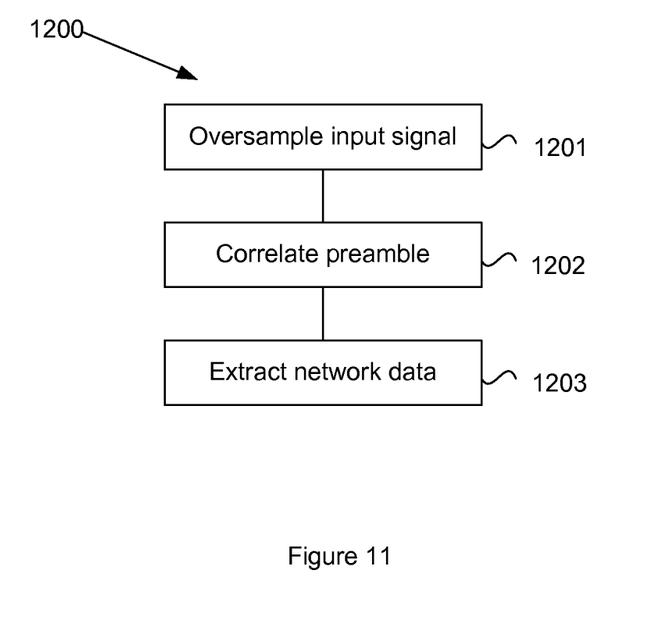
FIG. 11 shows a flowchart of a method for diagnosing a network condition of a passive optical network.

The CDR of the above described embodiments can be used to enhance the PON upstream communication performance and reliability, by using information extracted from the oversampled upstream data available within the oversampling CDR. In one embodiment, a method 1200 indicated in FIG. 11 may be used to diagnose a network condition of the passive optical network. In the method, at step 1201, an input signal is oversampled and the preamble of the oversampled signal is correlated at step 1202. The correlation of the preamble includes determining a phase of the input signal. At step 1203, data relating to the network condition is extracted from the oversampled signal using the correlated preamble of the oversampled signal. In various embodiments, the extracted data may enable active control of TIA/LA circuitry to achieve and maintain ideal signal duty cycle, filtering of flipped bits in the received signal caused by optical or electrical noise, remote control of the ONT power driver to achieve optimal power level and collecting of signal quality statistics in order to identify faulty ONTs or detect network problems.

In one embodiment, the CDR is implemented as an application-specific integrated circuit (ASIC). In one embodiment, the CDR is implemented as a core which is part of an ASIC also including other cores that may or may not connect to the CDR core. In one embodiment, the CDR may be implemented as part of a System-on-a-Chip (SoC) ASIC. Further, embodiments of the present disclosure may be implemented in a field programmable gate array (FPGA) featuring a high-speed transceiver. The receiver part of the transceiver may be used as the oversampling shift register. In various embodiments, the FPGA may be implemented as a stand-alone FPGA design, or as part of a more complex FPGA design. In one embodiment, an integrated circuit may include circuitry configured to oversample an upstream signal from an ONT, correlate a preamble of the oversampled signal and process the correlated oversampled signal to diagnose on or more conditions of the passive optical network.

While the embodiments are described with specific reference to a PON, it will be readily understood by a person skilled in the art that the embodiments may equally apply to other TDMA communication networks.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A data recovery system for a time division multiple access network, the data recovery system comprising:
a signal sampler that samples an input signal at a frequency higher than a frequency of the input signal to produce an oversampled signal;
a preamble correlator that detects a preamble in said oversampled signal;
a delimiter detector that detects a delimiter in said oversampled signal;
a finite state machine comprising:
a first state prior to detection of a preamble by said preamble correlator;
a second state after detection of said preamble and prior to detection of a delimiter by said delimiter detector; and
a third state after detection of said delimiter;
wherein the finite state machine controls extraction of data from the oversampled signal; and
a duty cycle measurement module controlled by said finite state machine that measures a duty cycle of said oversampled signal during said third state.

2. The data recovery system according to claim 1 further comprising a phase selector that determines a phase of said oversampled signal.

3. The data recovery system according to claim 2 wherein said phase selector compares said oversampled signal with segments of a preamble at multiple phases of an oversampling clock and selects a phase of said oversampling clock that has a correlation with said oversampled signal above a high threshold value or a correlation with said oversampled signal below a low threshold value.

4. The data recovery system according to claim 2 wherein said preamble correlator comprises a first correlator that compares said oversampled signal with at least one segment of a preamble at a first duty cycle and at least one further correlator that compares said oversampled signal with at least one segment of a preamble at a further duty cycle.

5. The data recovery system according to claim 4 wherein said preamble correlator determines a duty cycle of said oversampled signal during at least one of said first state and said second state.

6. The data recovery system according to claim 1 wherein said duty cycle measurement module comprises:
   at least one comparator that compares at least one segment of said oversampled signal with a plurality of duty cycle bit widths; and
   at least one counter for each duty cycle bit width that counts a match between said at least one segment and the respective duty cycle bit width.

7. The data recovery system according to claim 1 further comprising at least one power estimation module that determines a power level of a transmitter that transmitted said input signal, wherein said power estimation module comprises:
   at least one bit buffer that stores at least a portion of said preamble; and
   at least one counter that counts a number of digital one bits of said portion of said preamble.

8. The data recovery system according to claim 7 wherein said at least one bit buffer receives a signal at a start of said first state to store oversampled data in said bit buffer and receives a signal at a transition between said first state and said second state to hold the oversampled data in said bit buffer.

9. The data recovery system according to claim 1 further comprising at least one digital filter that filters said oversampled signal, wherein said at least one digital filter receives an N-bit segment of said oversampled signal, wherein said at least one digital filter comprises a plurality of flipped bit filters, wherein each flipped bit filter receives M consecutive input bits of said N-bit segment, and wherein the output of each flipped bit filter is determined by a flipped bit logic table.

10. The data recovery system according to claim 9 comprising N−M+1 flipped bit filters, wherein the value of M is equivalent to the ratio of the sampling frequency to the input signal frequency.

11. The data recovery system according to claim 9 wherein said output of each flipped bit filter comprises:
   an interpretation value of the respective M input bits produced by said flipped bit logic table; and
   an indication value whether one or more of the respective M input bits have a digital value different to a value of the interpretation value.

12. The data recovery system according to claim 11 further comprising at least one adder that adds the number of said indication values to calculate a number of flipped bits for the N-bit segment.

13. The data recovery system according to claim 1 further comprising at least one jitter estimation module that estimates jitter in said oversampled signal.

* * * * *